US010229622B2

(12) United States Patent
Tann et al.

(10) Patent No.: US 10,229,622 B2
(45) Date of Patent: Mar. 12, 2019

(54) INVERSION BALANCING COMPENSATION

(71) Applicant: Apple Inc., Cupertino, CA (US)

(72) Inventors: Christopher P. Tann, San Jose, CA (US); Taesung Kim, Los Altos, CA (US); Sandro H. Pintz, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/812,868

(22) Filed: Nov. 14, 2017

(65) Prior Publication Data

US 2018/0068605 A1 Mar. 8, 2018

Related U.S. Application Data

(63) Continuation of application No. 14/986,181, filed on Dec. 31, 2015, now Pat. No. 9,984,608, which is a (Continued)

(51) Int. Cl.
*G09G 3/30* (2006.01)
*G09G 3/36* (2006.01)
(Continued)

(52) U.S. Cl.
CPC ....... *G09G 3/20* (2013.01); *G09G 2310/0254* (2013.01); *G09G 2310/063* (2013.01);
(Continued)

(58) Field of Classification Search
CPC combination set(s) only.
See application file for complete search history.

(56) References Cited

U.S. PATENT DOCUMENTS 6,219,019 B1 * 4/2001 Hasegawa ............ G09G 3/3614 315/169.4
6,507,330 B1 1/2003 Handschy et al.
(Continued)

FOREIGN PATENT DOCUMENTS

EP 2109094 A1 10/2009
JP 2003255306 A 9/2003
(Continued)

OTHER PUBLICATIONS

Notice of Allowance for Japanese Application No. 2016-569643 dated Apr. 2, 2018.

*Primary Examiner* — Wesner Sajous
(74) *Attorney, Agent, or Firm* — Fletcher Yoder PC

(57) ABSTRACT

System and method for improving displayed image quality of an electronic display that displays a first image frame by applying a first voltage to a display pixel and a second image frame directly before the first image frame by applying a second voltage to the display pixel. A display pipeline is communicatively coupled to the electronic display and receives first image data corresponding with the first image frame, where the image data includes a first grayscale value corresponding with the display pixel. Additionally the display pipeline determines an inversion balancing grayscale offset based at least in part on the first grayscale value when polarity of the first voltage and polarity of the second voltage are the same and determines magnitude of the first voltage by applying the inversion balancing grayscale offset to the first grayscale value to reduce likelihood of a perceivable luminance spike when displaying the first image frame.

20 Claims, 7 Drawing Sheets

Related U.S. Application Data continuation-in-part of application No. 14/725,545, filed on May 29, 2015, now Pat. No. 9,767,726.

(60) Provisional application No. 62/017,081, filed on Jun. 25, 2014.

(51) Int. Cl.

| | |
|---|---|
| ***H04N 1/60*** | (2006.01) |
| ***H04N 9/73*** | (2006.01) |
| ***G09G 3/20*** | (2006.01) |

(52) U.S. Cl.

CPC . *G09G 2310/08* (2013.01); *G09G 2320/0204* (2013.01); *G09G 2340/0435* (2013.01)

(56) References Cited

U.S. PATENT DOCUMENTS

| | | | | |
|---|---|---|---|---|
| 7,391,398 | B2 | 6/2008 | Inoue | |
| 7,738,001 | B2 | 6/2010 | Routley et al. | |
| 7,755,649 | B2 | 7/2010 | Brown Elliott et al. | |
| 8,237,647 | B2 | 8/2012 | Hosaka | |
| 8,248,341 | B2 | 8/2012 | Neugebauer | |
| 8,605,138 | B2 | 12/2013 | Son et al. | |
| 8,624,936 | B2 | 1/2014 | Kimura | |
| 9,449,571 | B2 | 9/2016 | Takahashi et al. | |
| 9,564,092 | B2 | 2/2017 | Fujioka et al. | |
| 9,589,517 | B2 | 3/2017 | Suyama et al. | |
| 2010/0265168 | A1 | 10/2010 | Neugebuer | |
| 2011/0221798 | A1 | 9/2011 | Cummings | |
| 2012/0162238 | A1 | 6/2012 | Fleck et al. | |
| 2012/0200554 | A1* | 8/2012 | Kim | G09G 3/344 345/211 |
| 2013/0235020 | A1 | 9/2013 | Kim et al. | |
| 2014/0184583 | A1 | 7/2014 | Wyatt | |
| 2014/0198093 | A1* | 7/2014 | Nambi | G09G 3/36 345/212 |
| 2014/0198138 | A1* | 7/2014 | Nambi | G09G 3/36 345/690 |
| 2014/0267448 | A1* | 9/2014 | Albrecht | G09G 3/3406 345/690 |
| 2015/0002381 | A1* | 1/2015 | Fujioka | G09G 3/3614 345/87 |
| 2015/0116373 | A1 | 4/2015 | Kim et al. | |
| 2015/0170598 | A1 | 6/2015 | Jeon et al. | |
| 2015/0194111 | A1 | 7/2015 | Slavenburg et al. | |
| 2015/0243233 | A1* | 8/2015 | Bloks | G09G 3/3614 345/96 |
| 2015/0243234 | A1 | 8/2015 | Bloks et al. | |
| 2015/0379918 | A1 | 12/2015 | Tann et al. | |
| 2016/0063933 | A1* | 3/2016 | Kobayashi | G09G 3/3614 345/691 |
| 2016/0365049 | A1 | 12/2016 | Uemura et al. | |

FOREIGN PATENT DOCUMENTS

| | | | |
|---|---|---|---|
| JP | WO2013125406 | A1 | 8/2013 |
| JP | 2013125406 | A1 | 7/2015 |
| KR | 10-2013-0121458 | A | 11/2013 |
| WO | 2014002607 | A1 | 1/2014 |
| WO | 2014080810 | A1 | 5/2014 |

* cited by examiner

INVERSION BALANCING COMPENSATION

CROSS REFERENCE TO RELATED APPLICATIONS

Under 35 U.S.C. § 120, this application is a continuation of U.S. patent application Ser. No. 14/986,181 filed Dec. 31, 2015, which is a continuation-in-part of U.S. patent application Ser. No. 14/725,545 filed May 29, 2015, which claims priority to U.S. Provisional Patent Application No. 62/017,081 filed Jun. 25, 2014, each of which is incorporated by reference herein in its entirety for all purposes.

BACKGROUND

The present disclosure relates generally to an electronic display, and more particularly, to inversion balancing in an electronic display.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, an electronic display may enable a user to perceive images by successively writing images to a display panel of the electronic display. More specifically, the images may be displayed on the electronic display by applying a voltage to the pixels in the display panel. In some circumstances, the polarity of the voltage applied to each pixel may be alternated between positive voltage and negative voltage to reduce the possibility of polarizing the pixel. For example, in a frame inversion technique, positive polarity voltages may be applied to the pixels on the display panel to display a first image (e.g., frame). Subsequently, negative polarity voltages may be applied to the pixels on the display panel to display a second image (e.g., frame).

As used herein, a "refresh rate" is intended to describe the frequency with which the images are written to the display panel. Accordingly, in some embodiment, adjusting the refresh rate of an electronic device may adjust the power consumption by the electronic display. For example, when the refresh rate is higher, the power consumption may also be higher. On the other hand, when the refresh rate is lower, the power consumption may also be lower. In fact, in some embodiments, the refresh rate may be dynamic even between successively displayed images. For instance, continuing with the above example, the first image may be displayed with a refresh rate of 60 Hz and the second image may be displayed with a refresh rate of 30 Hz. In other words, the negative polarity voltage may be applied to the display panel for twice as long as the positive polarity voltage. However, since the duration the opposite polarity voltages are applied to the display panel may be different when the refresh rate is variable, polarization may result in the pixels and reduce image quality.

As such, it would be beneficial to maintain image quality even when the refresh rate is dynamic, for example, by reducing the possibility of polarizing the pixels in the display panel.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to improving quality of images displayed on an electronic display particularly when refresh rate of the electronic display is dynamic. More specifically, when the refresh rate is dynamic, the duration each successive image (e.g., frame) is displayed may vary. As such, when inversion exclusively alternates between applying positive and negative voltages, polarization may occur in the electronic display pixels and reduce image quality.

Accordingly, when the refresh rate is dynamic, the techniques described herein may reduce the possibility of polarizing the pixels in the electronic display by determining the polarity of the voltage applied to write each image and the duration each image is displayed. In some embodiments, the duration each image is displayed may be based on the number of lines included in image data corresponding with each image. For example, a timing controller (TCON) in the electronic display may count the number of vertical blank (Vblank) lines and active lines in image data received from an image source. Based on the count value, the timing controller may then determine whether to apply a positive polarity voltage or a negative polarity voltage in the next image (e.g., frame).

More specifically, the timing controller may count up when a positive voltage is applied to the electronic display pixels and count down with a negative voltage is applied to the electronic display pixels, or vice versa. In some embodiments, the possibility of polarizing the electronic display pixels may be reduced by maintaining the counter value towards zero. Thus, when the count value is a positive number, the timing controller may determine that the next image should be written with a negative voltage and, when the count value is a negative number, the timing controller may determine that the next image should be written with a positive voltage. In other words, the inversion techniques may balance the duration that opposite polarity voltages are applied to the electronic display pixels, which may reduce the possibility of polarization.

BRIEF DESCRIPTION OF THE DRAWINGS

Various aspects of this disclosure may be better understood upon reading the following detailed description and upon reference to the drawings in which.

DETAILED DESCRIPTION

Figure 1:
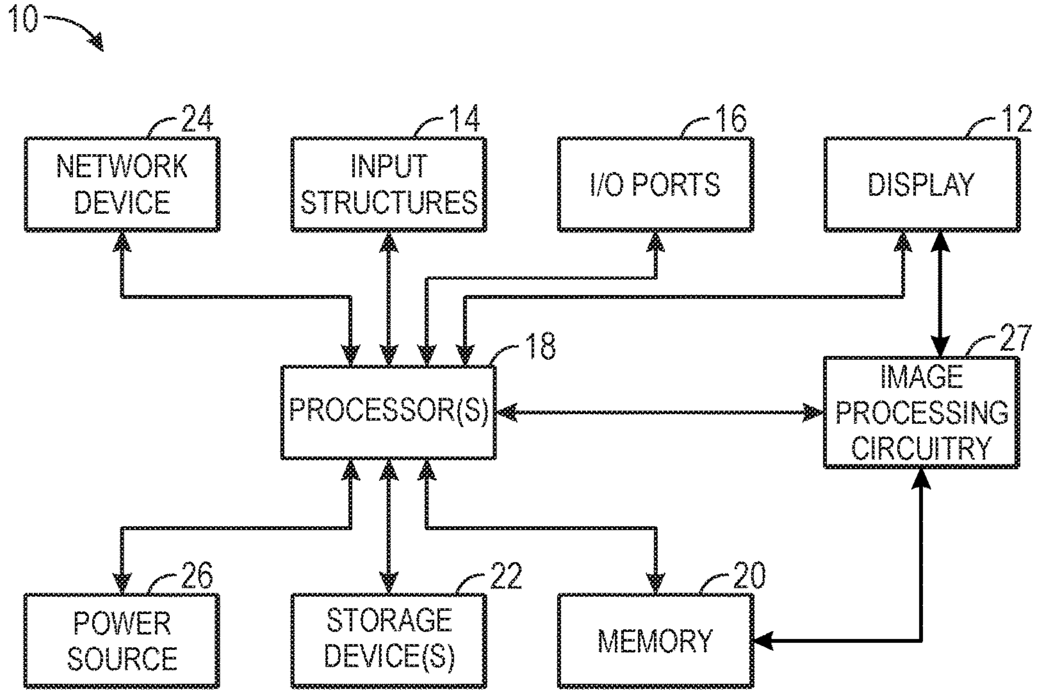
FIG. 1 is a block diagram of a computing device used to display images, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, an electronic display may display images by applying voltage to the pixels in a display panel. More specifically, the pixels may transmit light based at least in part on the magnitude of the voltage applied. However, when a direct current (DC) voltage is applied to the pixel for extended periods of time, the pixels may become polarized, which may reduce the displayed image quality. For example, when a positive voltage is applied to a pixel for an extended period of time, the pixel may begin to be polarized positive. As such, when a voltage is applied to the pixel, the positive polarization may cause the pixel to have a higher voltage than the applied voltage, which causes the pixel to inaccurately transmit light.

Thus, it may be beneficial to utilize inversion techniques by alternating the polarity of the voltage applied to the display panel to reduce the risk of pixels becoming polarized. For example, in a frame inversion technique, a first image may be written to the display panel by applying a positive voltage and a second image may be written to the display panel by applying a negative voltage. In other words, assuming that a constant refresh rate is used, applying a positive and a negative voltage in an alternating manner may enable the opposite voltages to cancel each other out and reduce the risk of polarization.

However, in some embodiments, an electronic display may have the capability to switch to a dynamic variable refresh rate. More specifically, the electronic display may switch from utilizing a constant refresh rate (e.g., 60 Hz per frame) to a dynamic variable refresh rate and vice versa, for example by using a control bit. For example, when a dynamic variable refresh rate is used, the refresh rate used to display a first image may be different from the refresh rate used to display a second image. In other words, the duration each image is displayed on the display panel may vary. In such embodiments, even alternating the polarity of the voltage applied to the display panel in each successively displayed image may still result in polarization of the pixels. For example, in an extreme case, a first image may be displayed at 30 Hz by applying a positive voltage, a second image may be displayed at 60 Hz by applying a negative voltage, a third image may be displayed at 30 Hz by applying a positive voltage, a fourth image may be displayed at 60 Hz by applying a negative voltage, and so on. In such a case, the positive voltage will be applied to the display panel for twice as long as the negative voltage. Thus, over an extended period of time, the pixels may still become polarized positive.

Accordingly, one embodiment of the present disclosure describes an electronic display that includes a display panel, which displays images with varying refresh rates, and a timing controller. More specifically, the timing controller receives image data from an image source, determines a counter value, and instructs a driver in the electronic display to apply a voltage to the display panel to write an image on the display panel based on the counter value. In some embodiments, the timing controller may instruct the driver to apply a negative voltage when the counter value is positive and a positive voltage when the counter value is less than or equal to zero or vice versa. Additionally, the timing controller updates the counter value based on the duration that the image is displayed on the display panel. In some embodiment, the timing controller may increase the counter value when the applied voltage is positive and decrease the counter value when the applied voltage is negative.

As will be described in more detail below, the counter value may be used to keep track of the duration positive voltage and negative voltage is applied to the display panel. As such, the counter value may be used to determine the polarity of voltage that should be applied to reduce the possibility of polarization. For example, when a first image is displayed at 30 Hz by applying a positive voltage, the counter value may indicate that a subsequent 60 Hz image should be displayed by applying a negative voltage. Additionally, the counter value may indicate that a second subsequent 60 Hz image should be displayed by applying a negative voltage. In other words, the techniques described herein allow for successively displayed images (e.g., frames) to be written using the same polarity voltage.

To help illustrate, a computing device 10 that utilizes an electronic display 12 to display images is described in FIG. 1. As will be described in more detail below, the computing device 10 may be any suitable computing device, such as a handheld computing device, a tablet computing device, a notebook computer, and the like.

Accordingly, as depicted, the computing device 10 includes the display 12, input structures 14, input/output (I/O) ports 16, one or more processor(s) 18, memory 20, nonvolatile storage 22, a network interface 24, and a power source 26, and image processing circuitry 27. The various components described in FIG. 1 may include hardware elements (including circuitry), software elements (including computer code stored on a non-transitory computer-readable medium), or a combination of both hardware and software elements. It should be noted that FIG. 1 is merely one example of a particular implementation and is intended to illustrate the types of components that may be present in the computing device 10. Additionally, it should be noted that the various depicted components may be combined into fewer components or separated into additional components. For example, the image processing circuitry 27 (e.g., graphics processing unit) may be included in the one or more processors 18.

As depicted, the processor 18 and/or image processing circuitry 27 are operably coupled with memory 20 and/or nonvolatile storage device 22. More specifically, the processor 18 and/or image processing circuitry 27 may execute instruction stored in memory 20 and/or non-volatile storage device 22 to perform operations in the computing device 10, such as generating and/or transmitting image data. As such, the processor 18 and/or image processing circuitry 27 may include one or more general purpose microprocessors, one or more application specific processors (ASICs), one or more field programmable logic arrays (FPGAs), or any combination thereof. Additionally, memory 20 and/or non volatile storage device 22 may be a tangible, non-transitory, computer-readable medium that stores instructions executable by and data to be processed by the processor 18 and/or image processing circuitry 27. In other words, the memory 20 may include random access memory (RAM) and the non-volatile storage device 22 may include read only memory (ROM), rewritable flash memory, hard drives, optical discs, and the like. By way of example, a computer program product containing the instructions may include an operating system (e.g., OS X® or iOS by Apple Inc.) or an application program (e.g., iBooks® by Apple Inc.).

Additionally, as depicted, the processor 18 is operably coupled with the network interface 24 to communicatively couple the computing device 10 to a network. For example, the network interface 24 may connect the computing device 10 to a personal area network (PAN), such as a Bluetooth network, a local area network (LAN), such as an 802.11x Wi-Fi network, and/or a wide area network (WAN), such as a 4G or LTE cellular network. Furthermore, as depicted, the processor 18 is operably coupled to the power source 26, which provides power to the various components in the computing device 10. As such, the power source 26 may includes any suitable source of energy, such as a rechargeable lithium polymer (Li-poly) battery and/or an alternating current (AC) power converter.

As depicted, the processor 18 is also operably coupled with I/O ports 16, which may enable the computing device 10 to interface with various other electronic devices, and input structures 14, which may enable a user to interact with the computing device 10. Accordingly, the inputs structures 14 may include buttons, keyboards, mice, trackpads, and the like. Additionally, in some embodiments, the display 12 may include touch sensitive components. For example, the electronic display 12 may be a MultiTouch™ display that can detect multiple touches at once.

In addition to enabling user inputs, the display 12 may display images. In some embodiments, the images displayed may be a graphical user interface (GUI) for an operating system, an application interface, a still image, or a video. As depicted, the display is operably coupled to the processor 18 and the image processing circuitry 27. Accordingly, the images displayed by the display 12 may be based on image data received from the processor 18 and/or the image processing circuitry 27.

As will be described in more detail below, the image data transmitted to the display 12 may determine the refresh rate with which images based on the image data are displayed. For example, the processor 18 and/or the image processing circuitry 27 may communicate the refresh rate to use based on the number of vertical blank (Vblank) lines include in the image data. Accordingly, once the image data is received, the display 12 may determine the refresh rate to use by determining the number of vertical blank lines and/or the number of active lines include in the image data. As will be described in more detail below, the number of lines (e.g., vertical blank and active lines) may directly correspond with duration an image is displayed because the time it takes for the display 12 to write one line is generally constant. For example, when a displayed image has a resolution of 2880×1800 and is displayed at 60 Hz, the image data may include 52 vertical blank lines and 1800 active lines. Thus, the duration the image is displayed may be described as 1852 lines.

Figure 2:
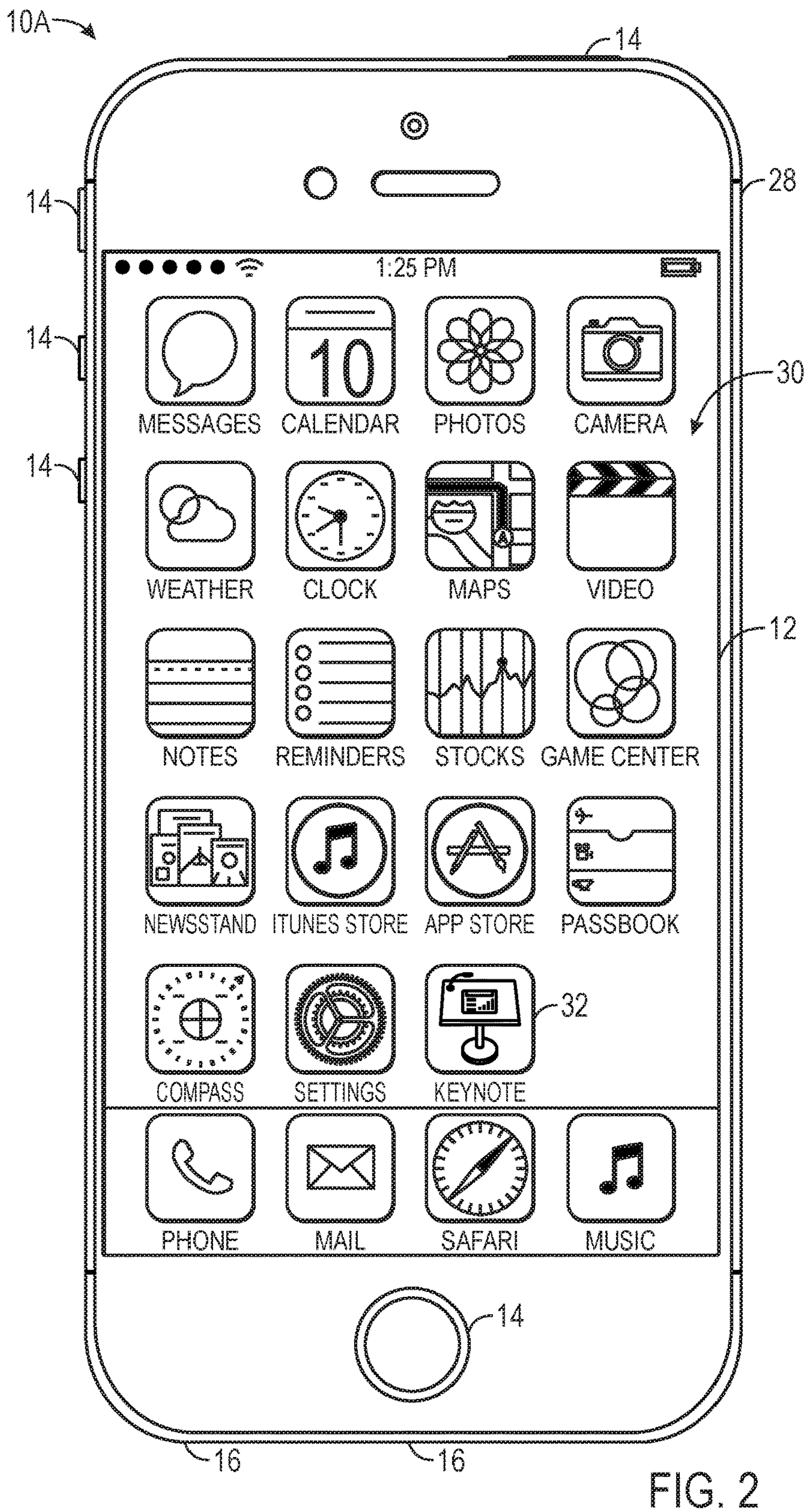
FIG. 2 is an example of the computing device of FIG. 1, in accordance with an embodiment.

As described above, the computing device 10 may be any suitable electronic device. To help illustrate, one example of a handheld device 10A is described in FIG. 2, which may be a portable phone, a media player, a personal data organizer, a handheld game platform, or any combination of such devices. Accordingly, by way of example, the handheld device 10A may be a model of an iPod® or iPhone® available from Apple Inc. of Cupertino, Calif.

As depicted, the handheld device 10A includes an enclosure 28, which may protect interior components from physical damage and to shield them from electromagnetic interference. The enclosure 28 may surround the display 12, which, in the depicted embodiment, displays a graphical user interface (GUI) 30 having an array of icons 32. By way of example, when an icon 32 is selected either by an input structure 14 or a touch sensing component of the display 12, an application program, such as iBooks® made by Apple Inc., may launch.

Additionally, as depicted, input structure 14 may open through the enclosure 28. As described above, the input structures 14 may enable a user to interact with the handheld device 10A. For example, the input structures 14 may activate or deactivate the handheld device 10A, navigate a user interface to a home screen, navigate a user interface to a user-configurable application screen, activate a voice-recognition feature, provide volume control, and toggle between vibrate and ring modes. Furthermore, as depicted, the I/O ports 16 open through the enclosure 28. In some embodiments, the I/O ports 16 may include, for example, an audio jack and/or a Lightning® port from Apple Inc. to connect to external devices.

Figure 3:
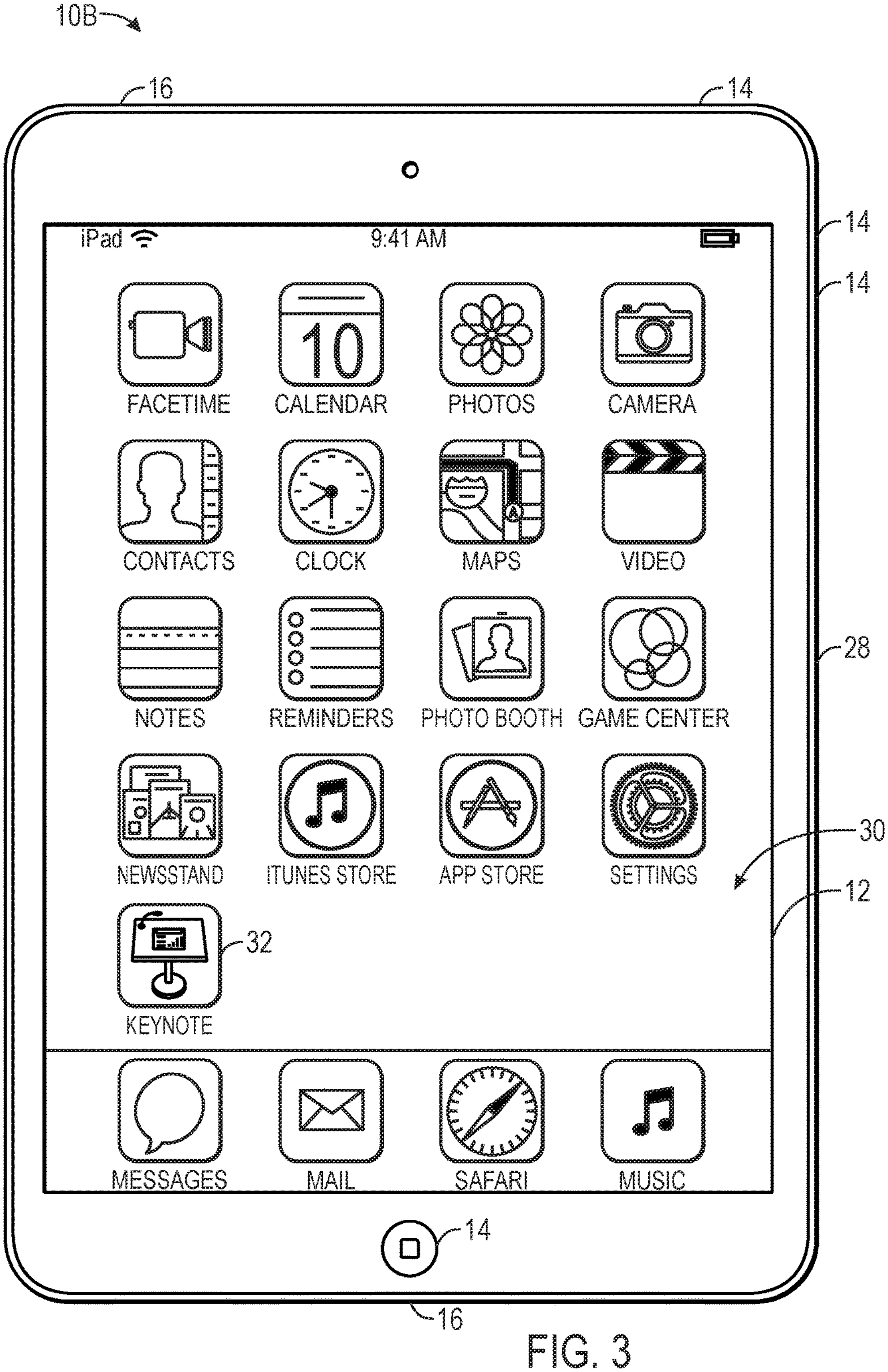
FIG. 3 is an example of the computing device of FIG. 1, in accordance with an embodiment.
Figure 4:
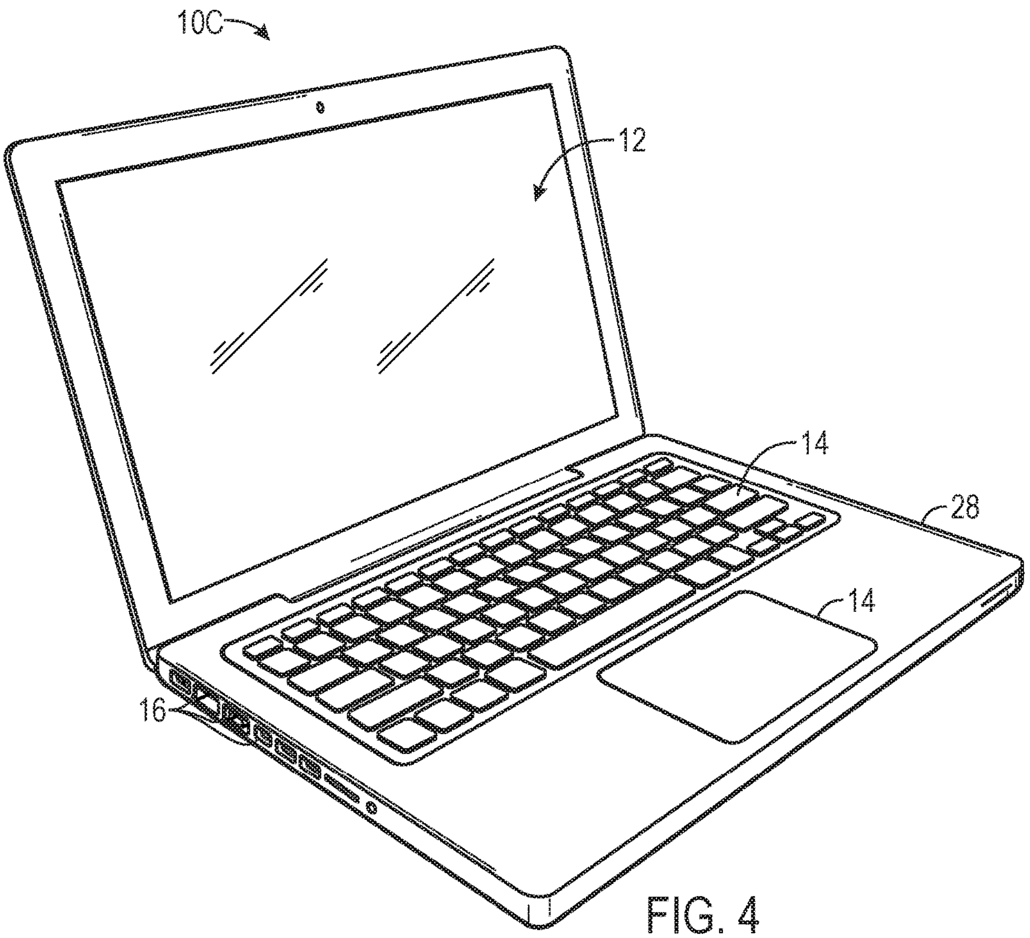
FIG. 4 is an example of the computing device of FIG. 1, in accordance with an embodiment.

To further illustrate a suitable computing device 10, a tablet device 10B is described in FIG. 3. By way of example, the tablet device 10B may be a model of an iPad® available from Apple Inc. Additionally, in other embodiments, the computing device 10 may take the form of a computer 10C as described in FIG. 4. By way of example, the computer 10C may be a model of a MacBook®, MacBook® Pro, MacBook Air®, iMac®, Mac® mini, or Mac Pro® available from Apple Inc. As depicted, the computer 10C also includes a display 12, input structures 14, I/O ports 16, and a housing 28.

Figure 5:
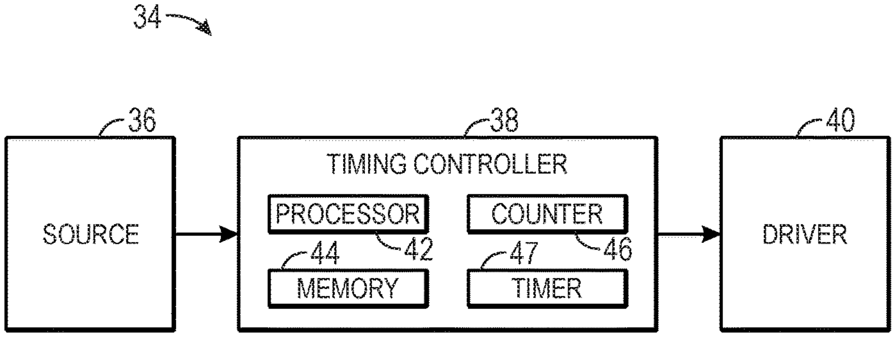
FIG. 5 is block diagram of a portion of the computing device of FIG. 1 used to display images, in accordance with an embodiment.

As described above, the display 12 may display images based on image data received from the processor 18 and/or the image processing circuitry 27. More specifically, the image data may be processed by any combination of the processor 18, the image processing circuitry 27, and the display 12 itself. To help illustrate, a portion 34 of the computing device 10 that processes and communicates image data is described in FIG. 5.

As depicted, the portion 34 of the computing device 10 includes an image source 36, a timing controller (TCON) 38, and a display driver 40. More specifically, the source 36 may generate image data and transmit the image data to the timing controller 38. Accordingly, in some embodiments, the source 36 may be the processor 18 and/or the image processing circuitry 27. Additionally, in some embodiments, the timing controller 38 and the display driver 40 may be included in the electronic display 12.

As described above, the display 12 may display an image based at least in part on the received image data. As such, the timing controller 38 may analyze the received image data and instruct the driver 40 to write an image to the pixels by applying a voltage to the display panel of the electronic display 12. To facilitate processing/analyzing the image data and/or performing other operations, the timing controller 38 may include a processor 42 and memory 44. In some embodiments, the timing controller processor 42 may be included in the processor 18 and/or the image processing circuitry 27. In other embodiments, the timing controller processor 42 may be a separate processing module. Additionally, in some embodiments, the timing controller memory 44 may be included in memory 20, storage device 22, or another tangible, non-transitory, computer readable medium. In other embodiments, the timing controller memory 44 may be a separate tangible, non-transitory, computer readable medium that stores instructions executable by the timing controller processor 42.

More specifically, the timing controller 38 may analyze the received image data to determine the magnitude of voltage to apply to each pixel to achieve the desired image and instruct the driver 40 accordingly. Additionally, the timing controller 38 may analyze the received image data to determine the refresh rate with which to display an image described by the image data and instruct the driver 40 accordingly. More specifically, the timing controller 38 may determine the refresh rate based at least in part on the number of vertical blank (Vblank) lines and/or active lines included in the image data.

For example, when the display 12 displays images with a resolution of 2880×1800, the timing controller 38 may instruct the driver 40 to display a first image at 60 Hz when the timing controller 38 determines that corresponding image data includes 52 vertical blank lines and 1800 active lines. Additionally, the timing controller 38 may instruct the driver 40 to display a second image at 30 Hz when the timing controller 38 determines that corresponding image data includes 1904 vertical blank lines and 1800 active lines.

As described above, a line (e.g., active or vertical blank) is used to describe the amount of time to write an image to one row of pixels. More specifically, since each row of pixels in the display panel is successively written, the duration an image is displayed includes the number of active lines in corresponding image data. Additionally, when a vertical blank line in the corresponding image data is received, the displayed image may continue to be displayed. As such, the total duration an image is displayed may be described as the sum of the number of vertical blank lines and the number of active lines in the corresponding image data. To help illustrate, continuing with the above example, the duration the first image is displayed may be 1852 lines and the duration the second image is displayed may be 3704 lines.

More specifically, as described above, the duration positive and negative voltages are applied to the display panel may be used to determine polarity of the voltage to use for writing the next image. Accordingly, the timing controller 38 may utilize a counter 46 to keep track. For example, in some embodiments, the counter 46 may count up when a positive voltage is applied and count down when a negative voltage applied. Additionally, the timing controller 38 may instruct the driver 40 to apply a negative voltage to the display panel when the counter value is positive and to apply a positive voltage to the display when the counter value is negative. In other words, the timing controller 38 may maintain the counter value towards zero. Thus, in some embodiments, the counter 46 may be sized such that the maximum positive and negative value is equal to the total number of lines in an image (e.g., frame). For example, the counter 46 may be 24 bits signed to accommodate refresh rates below 0.2 Hz.

As such, the possibility of polarizing the pixels may be reduced by applying positive voltages and negative voltages for approximately equal amounts of time. Thus, the timing controller 38 may determine the number of vertical blank lines and/or active lines to determine polarity of the voltage to apply to the display panel to write the next successive image when the image source 36 is in an active mode and communicate the determined polarity to the driver 40, for example, using the Common Device Interface (CDI). However, in some embodiments, to further conserve power, the source 36 may utilize Advanced Link Power Management (ALPM). More specifically, the source 36 may enter a sleep mode when the source 36 determines that the next subsequent image to be displayed is the same as the previously displayed image.

However, when the source 36 stops transmitting image data, the voltage applied to display the previous image continues to be held in the pixels. In other words, the voltage continues to be applied to the pixels even when new images are not being written to the display panel. As such, the timing controller 38 may continue to account for the duration the voltage is being held by the pixels in the display panel using a timer 47. More specifically, the timer 47 may continue to keep track of the duration that the voltage is held. Thus, since the time used to write a line is generally constant, the timing controller 38 may continue keeping track of duration voltage is held by dividing the timer value by the time generally used to write a line in an image. In some embodiments, the time used to write a line may be predetermined and stored in the timing controller memory 44. Thus, as will be described in more detail below, the counter 46 may continue counting up while a positive voltage is being held in the display panel and continue counting down while a negative voltage is being held in the display panel based on the timer value.

Accordingly, even when the source 36 enters a sleep mode and ceases transmitting image data, the counter 46 may continue keeping track of duration positive voltages and negative voltages have been applied to the display panel. Thus, as described above, the timing controller 38 may determine the polarity of voltage to apply to write the next subsequent image based on the counter value and instruct the driver 40 accordingly.

Figure 6:
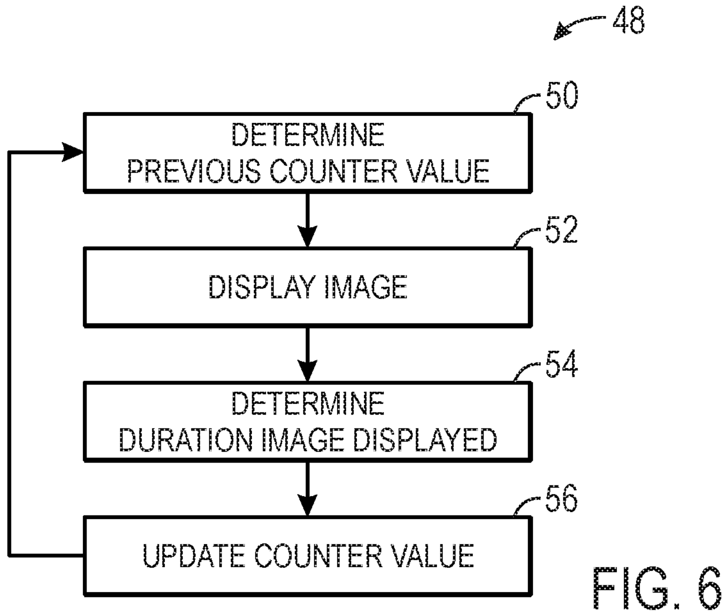
FIG. 6 is a flow diagram of a process for reducing the possibility of polarization, in accordance with an embodiment.

To help illustrate, one embodiment of a process 48 for displaying images is described in FIG. 6. Generally, the process 48 includes determining a previous counter value (process block 50), displaying an image (process block 52), determining duration the image is displayed (process block 54), and updating the counter value (process block 56). In some embodiments, the process 48 may be implemented using instructions stored in the timing controller memory 44 and/or another suitable tangible non-transitory computer-readable medium and executable by the timing controller processor 42 and/or another suitable processing circuitry.

Accordingly, the timing controller 38 may determine the previous counter value by polling the counter 46 (process block 50). In some embodiments, the timing controller 38 may poll the counter 46 whenever image data is received from the source 36. As described above, the previous counter value may then be used to determine polarity of voltage to use to write an image to the display panel.

Thus, the timing controller 38 may instruct the driver 40 to write an image to the pixels of the display panel based on the received image data and the previous counter value (process block 52). More specifically, the timing controller 38 may determine magnitude of voltage to apply to the pixels in the display panel based on the active lines included in the received image data and the polarity of the voltage to apply based on the previous counter value. As described above, the timing controller 38 may determine the magnitude of the voltage to apply to control brightness of each pixel.

Figure 7:
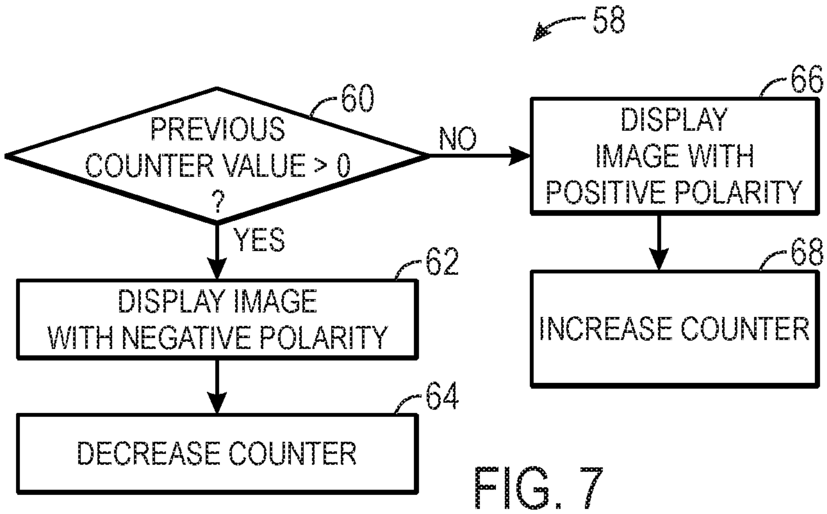
FIG. 7 is a flow diagram of a process for displaying an image (e.g., frame) based on a counter value, in accordance with an embodiment.

Additionally, the timing controller 38 may determine the polarity of the voltage to use for applying the determined voltage magnitude based on the previous counter value. To help illustrate, one embodiment of a process 58 for determining polarity of the voltage to apply is described in FIG. 7. Generally, the process 58 includes determining whether the previous counter value is greater than zero (decision block 60) and when the counter value is greater than zero, displaying an image with a negative polarity (process block 62) and decreasing the counter value (process block 64). On the other hand, when the counter value is not greater than zero (e.g., less than or equal to zero), the process 58 includes displaying an image with a positive polarity (process block 66) and increasing the counter value (process block 68). In some embodiments, process 58 may be implemented using instructions stored in the timing controller memory 44 and/or another suitable tangible non-transitory computer-readable medium and executable by the timing controller processor 42 and/or another suitable processing circuitry.

Accordingly, once the previous counter value is received, the timing controller 38 may determine whether the previous counter value is greater than zero (decision block 60). When the previous counter value is greater than zero, the timing controller 38 may instruct the driver 40 to apply a negative polarity voltage at the determined magnitude (process block 62). On the other hand, when the previous counter value is not greater than zero, the timing controller 38 may instruct the driver 40 to apply a positive polarity voltage at the determined magnitude (process block 66).

Additionally, returning to FIG. 6, once the image is displayed, the timing controller 38 may determine the duration to display the image based on the received image data (process block 54). More specifically, when active lines are received, a corresponding image is written to the pixels in the display panel. Additionally, when vertical blank lines are received, the image is continued to be displayed. In other words, the voltage at the determined magnitude and polarity may be applied for a duration equal to the number of active lines and vertical blank lines in the image data.

As such, the counter value may be updated to keep track of the duration respective positive and negative polarity voltages are applied by increasing or decreasing the counter value (process block 56). More specifically, returning to FIG. 7, the counter 46 may be increased when a positive polarity voltage is applied (process block 68). On the other hand, the counter 46 may be decreased when a negative polarity voltage is applied (process block 64). Thus, the amount the counter value may be increased or decreased (e.g., updated or incremented) by the number of lines (e.g., vertical blank and/or active) included in the image data.

Figure 8:
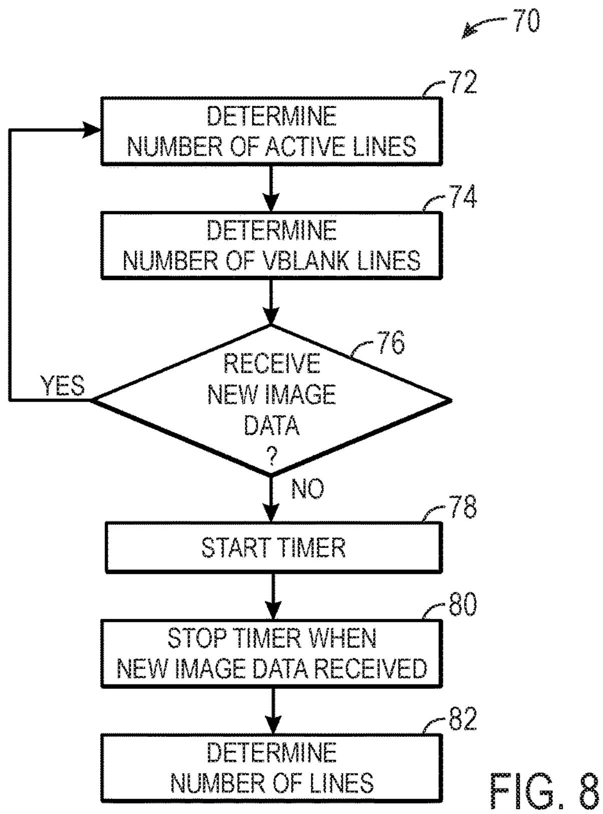
FIG. 8 is a flow diagram of a process for updating the counter value, in accordance with an embodiment.

To help illustrate, one embodiment of a process 70 for determining the amount to increase or decrease the counter 46 is described in FIG. 8. Generally, the process 70 includes determining the number of active lines included in the image data (process block 72), determining the number of vertical blank (Vblank) lines included in the image data (process block 74), and determining whether new image data is received (decision block 76). When new image data is received, the number of vertical blank lines and active lines may again be determined based on the new image data. On the other hand, when new image data is not received, the process 70 includes starting a timer (process block 78), stopping the timer when new image data is received (process block 80), and determining the number of lines the timer was running for (process block 82). In some embodiments, process 70 may be implemented using instructions stored in the timing controller memory 44 and/or another suitable tangible non-transitory computer-readable medium and executable by the timing controller processor 42 and/or another suitable processing circuitry.

Accordingly, the timing controller 38 may determine the number of active lines in the received image data (process block 72). Generally, the image data includes one active line for each row of the display 12. In other words, the number of active rows is generally equivalent to the height of the resolution of the displayed image. For example, when the displayed image has a resolution of 2880×1800, the image data may include 1800 active lines. Accordingly, in some embodiments, the timing controller 38 may count the number of active lines included in the image data. Additionally or alternatively, the number of active lines may be predetermined and stored in the timing controller memory 44.

Additionally, the timing controller 38 may determine the number of vertical blank lines included in the received image data (process block 74). In some embodiments, the vertical blank lines may include a vertical front porch, a vertical sync pulse, and a vertical back porch. More specifically, the vertical front porch may include a number of blank (e.g., black) lines that are transmitted before the vertical sync pulse, which may also last for several lines. After the vertical sync pulse, the vertical back porch may transmitted, which also includes a number of blank (e.g., black) lines. Thus, the timing controller 38 may determine the number of vertical blank lines by counting the number of blank lines and the number of lines in the vertical sync pulse in the received image data.

Thus, the timing controller 38 may determine the duration an image corresponding with received image data is displayed by adding together the number of vertical blank lines and the number of active lines received from the source 36. However, as described above, power consumption may be improved by placing the source 36 into sleep mode and ceasing transmission of image data, for example, when a subsequent image is the same as a previous image. More specifically, when the source 36 ceases transmission of the image data, the display 12 continues to hold the voltage in the pixels of the display panel. Thus, the duration the voltage is held in the pixels should also be accounted for.

As such, when new image data is not received, the timing controller 38 starts the timer 47 (process block 78). The timing controller 38 stops the timer 47 when new image data is received (process block 80), which indicates that the source 36 is no longer asleep. Thus, the timer 47 may indicate the amount of time the voltage was held in the pixels while the source 36 was asleep.

Since the duration to write a line is generally constant, the equivalent number of lines that the voltage is held in the pixels may be determined (process block 82). More specifically, the duration measured by the timer 47 may be divided by the time used to write one row (e.g., line) of an image. For example, if it takes one millisecond to write a row of an image and the timer 47 determines that the voltage was held for five milliseconds, the timing controller 38 may determine that voltage was held by the pixels for an equivalent of five lines. Additionally or alternatively, the counter 46 may simply count up or count down each time duration for writing one line passes.

Figure 9:
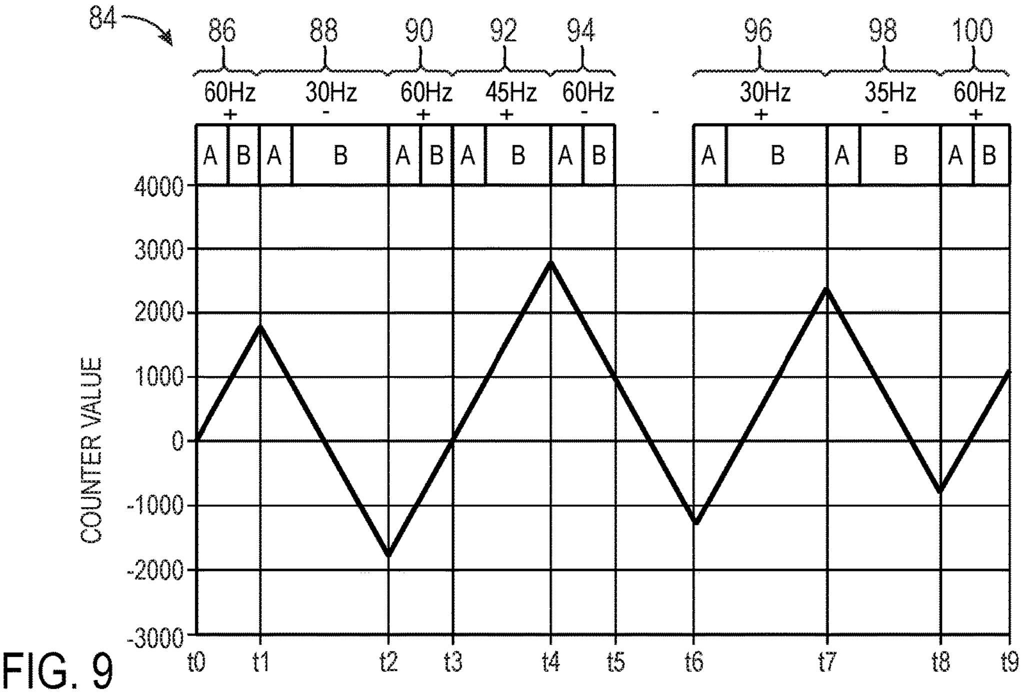
FIG. 9 is an example of a counter value in relation to a hypothetical operation of an electronic display, in accordance with an embodiment.

Based on the above described techniques, the duration positive and negative voltages are applied/held may be balanced to reduce possibility of polarizing the pixels. To help illustrate the techniques, a hypothetical display operation 84 is described in FIG. 9. More specifically, the hypothetical display operation 84 describes image data received by the display 12 between t0 and t9.

As depicted, first image data 86 begins to be received at t0. To display a first image corresponding with the first image data 86 the timing controller 38 may analyze the first image data 86 to determine the magnitude of the voltage to apply to write the first image. More specifically, the timing controller 38 may determine the magnitude of the voltage to apply based on the active lines included in the first image data 86. Additionally, in response to receiving the first image data 86, the timing controller 38 may poll the counter 46 and determine that the previous counter value is zero. Thus, the timing controller 38 may determine that a positive polarity voltage should be applied to the pixels in the display panel to write the first image.

Furthermore, the timing controller 38 may determine the refresh rate based on the total number of lines (e.g., vertical blank and active) included in the image data. For example, in the depicted example, the timing controller 38 may determine that the first image should be displayed at 60 Hz because the first image data 86 includes 52 vertical blank lines and 1800 active lines (e.g., 1852 total lines). Accordingly, the timing controller 38 may instruct the driver 40 to use a positive voltage at the determined magnitude at 60 Hz to display the first image. Additionally, since a positive voltage is applied, the counter 46 will count up 1852 lines. Thus, at t1, the counter value may be 1852.

Subsequently, as depicted, second image data 88 begins to be received at t1. Similar to displaying the first image, to display a second image corresponding with the second image data 88, the timing controller 38 may determine the magnitude of the voltage to apply based on the active lines included in the second image data 88. Additionally, in response to receiving the second image data 88, the timing controller 38 may poll the counter 46 and determine that the previous counter value is 1852. Thus, the timing controller 38 may determine that a negative polarity voltage should be applied to the pixels in the display panel to write the second image.

Furthermore, the timing controller 38 may determine that the second image should be displayed at 30 Hz because the second image data 86 includes 1904 vertical blank lines and 1800 active lines (e.g., 3704 total lines). Accordingly, the timing controller 38 may instruct the driver 40 to use a negative voltage at the determined magnitude at 30 Hz to display the second image. Additionally, since a negative voltage is applied, the counter 46 will count down 3704 lines. Thus, at t2, the counter value may be −1852.

Then, as depicted, third image data 90 begins to be received at t2. Similar to displaying the first and second images, to display a third image corresponding with the third image data 90, the timing controller 38 may determine the magnitude of the voltage to apply based on the active lines included in the third image data 90. Additionally, in response to receiving the third image data 90, the timing controller 38 may poll the counter 46 and determine that the previous counter value is −1852. Thus, the timing controller 38 may determine that a positive polarity voltage should be applied to the pixels in the display panel to write the third image.

Furthermore, the timing controller 38 may determine that the third image should be displayed at 60 Hz because the third image data 90 includes 52 vertical blank lines and 1800 active lines (e.g., 1852 total lines). Accordingly, the timing controller 38 may instruct the driver 40 to use a positive voltage at the determined magnitude at 60 Hz to display the third image. Additionally, since a positive voltage is applied, the counter 46 will count up 1852 lines. Thus, at t3, the counter value may be zero.

As depicted, fourth image data 92 begins to be received at t3. Similar to displaying the first through third images, to display a fourth image corresponding with the fourth image data 92, the timing controller 38 may determine the magnitude of the voltage to apply based on the active lines included in the fourth image data 92. Additionally, in response to receiving the fourth image data 92, the timing controller 38 may poll the counter 46 and determine that the previous counter value is zero. Thus, the timing controller 38 may determine that a positive polarity voltage should again be applied to the pixels in the display panel to write the fourth image. As such, two positive polarity voltages are applied to write successive images. In other words, the voltages applied using the present techniques do not necessarily alternate in successive images.

Furthermore, the timing controller may determine that the fourth image should be displayed at 45 Hz because the fourth image data 86 includes 978 vertical blank lines and 1800 active lines (e.g., 2778 total lines). In other words, the refresh rate with which images may be displayed is not limited to 30 Hz and 60 Hz and can be any refresh rate suitable for the display 12. In fact, in some embodiments, the refresh rate may be anywhere from 0.2-75 Hz. The timing controller 38 may then instruct the driver 40 to use a positive voltage at the determined magnitude at 45 Hz to display the fourth image. Additionally, since a positive voltage is applied, the counter 46 will count up 2778 lines. Thus, at t4, the counter value may be 2778.

Then, as depicted, fifth image data 94 begins to be received at t4. Similar to displaying the first through fourth images, to display a fifth image corresponding with the fifth image data 94, the timing controller 38 may determine the magnitude of the voltage to apply based on the active lines included in the fifth image data 94. Additionally, in response to receiving the fifth image data 94, the timing controller 38 may poll the counter 46 and determine that the previous counter value is 2778. Thus, the timing controller 38 may determine that a negative polarity voltage should be applied to the pixels in the display panel to write the fifth image.

Furthermore, the timing controller 38 may determine that the fifth image should be displayed at 60 Hz because the fifth image data 94 includes 52 vertical blank lines and 1800 active lines (e.g., 1852 total lines). Accordingly, the timing controller 38 may instruct the driver 40 to use a negative voltage at the determined magnitude at 60 Hz to display the fifth image. Additionally, since a negative voltage is applied, the counter 46 will count down 1852 lines. Thus, at t5, the counter value may be 926.

At t5, the source 36 may go into a sleep mode and cease transmitting image data. As such, the display 12 may continue to hold the negative voltage used to display the fifth image in the display panel pixels. Thus, in response to detecting that new image data is not received, the timing controller 38 may start the timer 47 at t5. Subsequently, at t6, sixth image data may be received. Thus, in response to detecting that a new image has been received, the timing controller 38 may stop the timer 47 at t6.

As described above, using the timer value, the timing controller 38 may update the counter 46. More specifically, the timing controller 38 may update the counter value by dividing the timer value by time generally used to write a line of an image. For example, assuming that it generally takes 1 ms to write one line of an image and the timer value at t6 is 2222, the timing controller 38 may determine that between t5 and t6 a negative voltage is held in the display panel pixels for 2222 lines. Thus, the counter value at t6 may be −1296. In some embodiments, the timing controller 38 may update the counter value while the timer 47 measures the duration. In other words, the counter 46 may count down every 1 ms between t5 and t6. Additionally or alternatively, the timing controller 38 may update the counter value when new image data is received (e.g., at t6).

As depicted, sixth image data begins to be received at t6. Similar to displaying the first through fifth images, to display a sixth image corresponding with the sixth image data 96, the timing controller 38 may determine the magnitude of the voltage to apply based on the active lines included in the sixth image data 96. Furthermore, in response to receiving the sixth image data 96, the timing controller 38 may poll the counter 46 and determine that the previous counter value is −1296. Thus, the timing controller 38 may determine that a positive polarity voltage should be applied to the pixels in the display panel to write the sixth image.

Furthermore, the timing controller 38 may determine that the sixth image should be displayed at 30 Hz because the sixth image data 96 includes 1904 vertical blank lines and 1800 active lines (e.g., 3704 total lines). Accordingly, the timing controller 38 may instruct the driver 40 to use a positive voltage at the determined magnitude at 30 Hz to display the sixth image. Additionally, since a positive voltage is applied, the counter 46 will count up 3704 lines. Thus, at t7, the counter value may be 2408.

Subsequently, as depicted, seventh image data 98 begins to be received at t7. Similar to displaying the first through sixth images, to display a seventh image corresponding with the seventh image data 98, the timing controller 38 may determine the magnitude of the voltage to apply based on the active lines included in the seventh image data 98. Furthermore, in response to receiving the seventh image data 98, the timing controller 38 may poll the counter 46 and determine that the previous counter value is 2408. Thus, the timing controller 38 may determine that a negative polarity voltage should be applied to the pixels in the display panel to write the seventh image.

Furthermore, the timing controller 38 may determine that the seventh image should be displayed at 35 Hz because the seventh image data 98 includes 1375 vertical blank lines and 1800 active lines (e.g., 3175 total lines). Accordingly, the timing controller 38 may instruct the driver 40 to use a negative voltage at the determined magnitude at 35 Hz to display the seventh image. Additionally, since a negative voltage is applied, the counter 46 will count down 3175 lines. Thus, at t8, the counter value may be −767.

Then, as depicted, eighth image data 100 begins to be received at t8. Similar to displaying the first through seventh images, to display an eighth image corresponding with the eighth image data 100, the timing controller 38 may determine the magnitude of the voltage to apply based on the active lines included in the eighth image data 100. Furthermore, in response to receiving the eighth image data 100, the timing controller 38 may poll the counter 46 and determine that the previous counter value is −767. Thus, the timing controller 38 may determine that a positive polarity voltage should be applied to the pixels in the display panel to write the eighth image.

Furthermore, the timing controller 38 may determine that the eighth image should be displayed at 60 Hz because the eighth image data 100 includes 52 vertical blank lines and 1800 active lines (e.g., 1852 total lines). Accordingly, the timing controller 38 may instruct the driver 40 to use a positive voltage at the determined magnitude at 60 Hz to display the eighth image. Additionally, since a positive voltage is applied, the counter 46 will count down 1852 lines. Thus, at t9, the counter value may be 1085.

Based on the above hypothetical operation 84, the duration that positive voltages and negative voltages are applied/held may be balanced such that the possibility of polarizing pixels in the display panel may be reduced. More specifically, the above example assumes a linear relationship between duration a voltage is applied and the possibility of polarization. In other words, a positive voltage applied for one line should exactly cancel out a negative voltage applied for one line. However, in other embodiments, the relationship may be non-linear. To implement a non-linear embodiment, the amount the counter 46 counts up or down may be adjusted. For example, the longer a voltage is applied/held the less the counter 46 may count up or down. In other words, a non-linear counter may be used.

Figure 10:
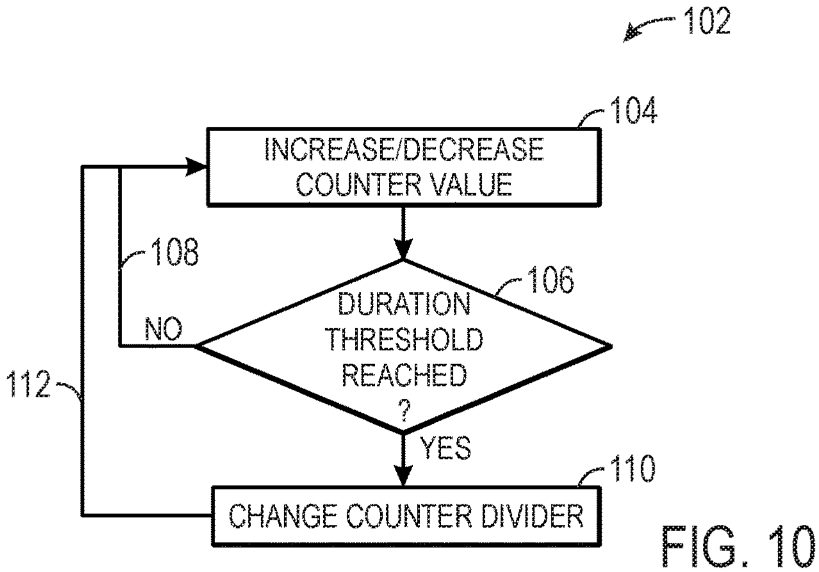
FIG. 10 is a flow diagram of a non-linear process for updating the counter value, in accordance with an embodiment.

To help illustrate, one embodiment of a process 102 for using a non-linear counter is described in FIG. 10. Generally, the process 102 includes increasing/decreasing the counter value (process block 104), determining whether the counter value has reached a duration threshold (decision block 106), and, when the duration threshold has not been reached, continuing the increase/decrease the counter (arrow 108). On the other hand, when the duration threshold is reached, the process 102 includes changing the counter divider (process block 110) and returning to increasing/decreasing the counter (arrow 112). In some embodiments, process 102 may be implemented using instructions stored in the timing controller memory 44 and/or another suitable tangible non-transitory computer-readable medium and executable by the timing controller processor 42 and/or another suitable processing circuitry.

As in the linear embodiments described above, the timing controller 38 may update (e.g., increase or decrease) the counter value based on the duration an image is displayed (process block 104). However, once the timing controller 38 determines that a duration threshold has been reached (decision block 106), a counter divider value may be applied (process block 110). More specifically, in some embodiments, a counter divider may be applied so that the counter value adjusts at smaller increments. For example, a counter divider value of two may be applied once a duration threshold is reached. In such an embodiment, the counter 46 may be adjusted one unit for every two lines.

To help illustrate, an example of a duration threshold versus counter divider relationship is described below.

TABLE 1

| Duration threshold vs. Counter Divider | |
|---|---|
| Duration threshold | Counter Divider |
| 1852 | 2 |
| 3704 | 3 |
| 5556 | 4 |
| 7408 | 5 |
| 9260 | 6 |

In the described example, the duration thresholds and the counter dividers are set in a monotonically increasing fashion. However, in other embodiments, the duration threshold and the counter dividers may be set in any suitable manner. Furthermore, in other embodiments, additionally duration thresholds and counter dividers may be used.

Figure 11:
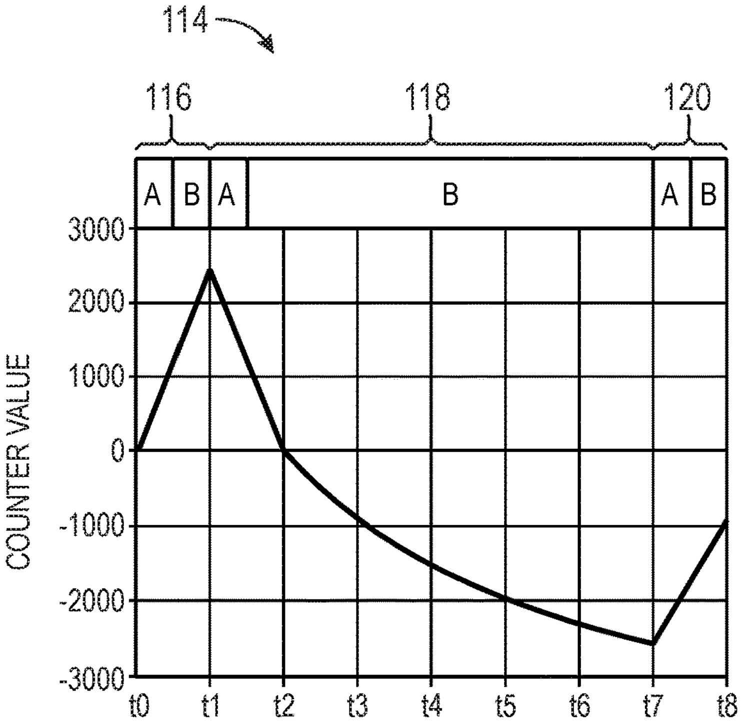
FIG. 11 is an example of a non-linear counter value in relation to a hypothetical operation of an electronic display, in accordance with an embodiment.

To help illustrate the use of the duration threshold versus counter divider relationship, the relationship is described with regard to the hypothetical display operation 114 described in FIG. 11. As depicted, first image data 116 begins to be received at t0. In response to receiving the first image data 116, the timing controller 38 may poll the counter 46 and determine that the previous counter value is zero. Accordingly, the timing controller 38 may determine that a positive polarity voltage should be applied to the pixels in the display panel to write a first image corresponding with the first image 116. Thus, the counter 46 may begin to count up based on the number of lines included in the first image data 116, which includes 52 vertical blank lines and 1800 active lines (e.g., 1852 total lines). Since the duration thresholds have not been reached, the counter value may increase one unit per line for the duration the first image is displayed. Thus, the counter value at t1 may be 1852.

Then, as depicted, second image data 118 begins to be received at t1. In response to receiving the second image data, the timing controller 38 may poll the counter 46 and determine that the previous counter value is 1852. Accordingly, the timing controller 38 may determine that a negative polarity voltage should be applied to the pixels in the display panel to write the second image. Thus, the counter 46 may begin to count down based on the number of lines included in the first image data 116, which includes 9312 vertical blank lines and 1800 active lines (e.g., 11,112 total lines).

Based on the duration threshold versus counter divider relationship described above, the duration thresholds may be reached. More specifically, as depicted, the counter 46 may count down one unit per line until the first duration threshold (e.g., 1852) is reached. Thus, at t2, the duration the second image has been displayed is 1852 lines and the counter value is zero.

At t2, since the first duration threshold has been reached, the timing controller 38 may apply the corresponding counter divider, which as described above is two. As such, the counter 46 may count down one unit every two lines until the second duration threshold (e.g., 3704) is reached. Thus, at t3, the duration the second image has been displayed is 3704 lines and the counter value is −926.

At t3, since the second duration threshold has been reached, the timing controller 38 may again apply the corresponding counter divider, which as described above is three. As such, the counter 46 may count down one unit every three lines until the third duration threshold (e.g., 5556) is reached. Thus, at t4, the duration the second image has been displayed is 5556 lines and the counter value is −1543.

At t4, since the third duration threshold has been reached, the timing controller 38 may again apply the corresponding counter divider, which as described above is four. As such, the counter 46 may count down one unit every four lines until the fourth duration threshold (e.g., 7408) is reached. Thus, at t5, the duration the second image has been displayed is 7408 lines and the counter value is −2006.

At t5, since the fourth duration threshold is reached, the timing controller 38 may again apply the corresponding counter divider, which as described above is five. As such, the counter 46 may count down one unit every five lines until the fifth duration threshold (e.g., 9260) is reached. Thus, at t6, the duration the second image has been displayed is 9260 lines and the counter value is −2376.

At t6, since the fifth duration threshold is reached, the timing controller 38 may again apply the corresponding counter divider, which as described above is six. As such, the counter 46 may count down one unit every six lines. Thus, at t7, the counter value may be −2684.

Subsequently, as depicted, third image data 120 begins to be received at t7. In response to receiving the third image data 120, the timing controller 38 may poll the counter 46 and determine that the previous counter value is −2684. Accordingly, the timing controller 38 may determine that a positive polarity voltage should be applied to the pixels in the display panel to write a third image corresponding with the third image data 120. Thus, the counter 46 may begin to count up based on the number of lines included in the third image data 120, which includes 52 vertical blank lines and 1800 active lines (e.g., 1852 total lines). Since the duration thresholds have not been reached, the counter value may increase one unit per line for the duration the third image is displayed. Thus, the counter value at t8 may be −832.

Accordingly, the technical effects of the present disclosure include improving inversion techniques used by an electronic display particularly when the electronic display uses a dynamic variable refresh rate. More specifically, the likelihood of polarizing pixels in the electronic display may be reduced by using a counter. In some embodiments, the counter may keep track of duration that positive voltages are applied to the pixels and the duration that negative voltages are applied to the pixels. As such, the duration each polarity is applied may offset one another, which reduces the possibility of one being applied for substantially longer durations and polarizing the pixels.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A computing device comprising:

a pixel configured to facilitate displaying images with varying refresh rates on a display panel based at least in part on voltage signals applied to the pixel;

a driver electrically coupled to the pixel, wherein the driver is configured to apply a first voltage signal to the pixel based at least in part on first image data to facilitate displaying a first image on the display panel; and processing circuitry communicatively coupled to the driver, wherein the processing circuitry is configured to:

determine a first value indicative of pixel polarization that occurs in the pixel due to display of the first image based at least in part on a first display duration of the first image and a non-linear relationship between pixel polarization and display duration;

determine a first voltage polarity based at least in part on the first value; and instruct the driver to write a second image to the display panel directly after the first image by applying a second voltage signal with the first voltage polarity to the pixel to facilitate reducing the pixel polarization during display of the second image.

2. The computing device of claim 1, wherein, to determine the first voltage polarity, the processing circuitry is configured to:

determine that the first voltage polarity is a positive voltage polarity when the first value is indicative of the pixel being negatively polarized due to display of the first image; and determine that the first voltage polarity is a negative voltage polarity when the first value is indicative of the pixel being positively polarized due to display of the first image.

3. The computing device of claim 1, comprising a counter communicatively coupled to the processing circuitry, wherein the counter is configured to:

increment a counter value during display of the first image when the first voltage signal uses the first voltage polarity to write the pixel;

decrement the counter value during display of the first image when the first voltage signal uses a second voltage polarity opposite the first voltage polarity to write the pixel; and indicate the first value as the counter value between display of the first image and display of the second image.

4. The computing device of claim 1, wherein the processing circuitry is configured to:

determine a second value indicative of the pixel polarization that occurs in the pixel due to display of the second image based at least in part on a second display duration of the second image and the non-linear relationship between pixel polarization and display duration;

determine a second voltage polarity based at least in part on the second value; and instruct the driver to write a third image to the display panel after the second image by applying a third voltage signal with the second voltage polarity to the pixel to facilitate reducing the pixel polarization during display of the third image.

5. The computing device of claim 4, comprising a counter communicatively coupled to the processing circuitry, wherein the counter is configured to:

adjust a counter value at a first rate during display of the first image based at least in part on duration the first display duration of the first image is less than a duration threshold;

adjust the counter value at a second rate different from the first rate during display of the first image based at least in part on duration the first display duration of the first image is not less than the duration threshold to facilitate describing the non-linear relationship between pixel polarization and display duration;

indicate the first value as the counter value between display of the first image and display of the second image;

adjust the counter value from the first value at the first rate during display of the second image based at least in part on duration the second display duration of the second image is less than the duration threshold;

adjust the counter value at the second rate during display of the second image based at least in part on duration the second display duration of the second image is not less than the duration threshold to facilitate describing the non-linear relationship between pixel polarization and display duration; and indicate the second value as the counter value between display of the second image and display of the third image.

6. The computing device of claim 4, comprising:

an electronic display, wherein the electronic display comprises the pixel, the driver, and the processing circuitry; and an image source communicatively coupled to the electronic display, wherein:

the image source is configured to cease output of image data to the electronic display while operating in a sleep mode; and the processing circuitry is configured to determine the second value indicative of the pixel polarization that occurs in the pixel based at least in part on duration the image source operates in the sleep mode between display of the second image and display of the third image.

7. The computing device of claim 1, wherein the driver is configured to apply the second voltage signal to the pixel based at least in part on second image data to facilitate displaying the second image on the display panel.

8. The computing device of claim 1, wherein the computing device comprises a portable phone, a media player, a personal data organizer, a handheld game platform, a tablet device, a computer, or any combination thereof.

9. A method for operating an electronic display, comprising:

receiving, using the electronic display, first image data that indicates target luminance of a pixel in a first image to be displayed on the electronic display from an image source communicatively coupled to the electronic display;

determining, using the electronic display, a first voltage magnitude to be applied to the pixel to facilitate display of the first image based at least in part on the first image data;

determining, using the electronic display, pixel polarization expected to be present in the pixel directly before display of the first image based at least in part on duration since a previous image was written to the pixel and a non-linear relationship between pixel polarization and duration;

determining, using the electronic display, a first voltage polarity expected to facilitate reducing the pixel polarization present in the pixel directly before display of the first image when applied to the pixel; and displaying, using the electronic display, the first image, wherein displaying the first image comprises applying a first voltage signal with the first voltage magnitude and the first voltage polarity to the pixel.

10. The method of claim 9, comprising:

displaying, using the electronic display, the previous image based at least in part on previous image data received from the image source;

determining, using the electronic display, whether the image source switches to a sleep mode between display of the previous image and display of the first image based at least in part on duration between receipt of the previous image data and receipt of the first image data; and determining the duration since the previous image was written based on a sum of a sleep duration of the image source and a display duration of the previous image when the image source switches to the sleep mode between display of the previous image and display of the first image.

11. The method of claim 10, comprising:

determining, using the electronic display, the sleep duration of the image source when the image source switches to the sleep mode between display of the previous image and display of the first image, wherein determining the sleep duration comprises:

starting a timer after display of the previous image; and stopping the timer upon receipt of the first image data; and determining, using the electronic display, the display duration of the previous image by adjusting a counter value based at least in part on number of active lines and number of blank lines included in the previous image data.

12. The method of claim 10, wherein determining the pixel polarization expected to be present in the pixel directly before display of the first image when the image source switches to the sleep mode between display of the previous image and display of the first image comprises:

adjusting a counter value at a first rate during display of the previous image based at least in part on duration the display duration of the previous image is less than a first duration threshold;

adjusting the counter value at a second rate different from the first rate during display of the previous image based at least in part on duration the display duration of the previous image is not less than the first duration threshold to facilitate describing the non-linear relationship between pixel polarization and duration;

adjusting the counter value at a third rate while the image source is in the sleep mode based at least in part on duration the sleep duration of the image source is less than a second duration threshold;

adjusting the counter value at a fourth rate different from the third rate while the image source is in the sleep mode based at least in part on duration the sleep duration of the image source is not less than the second duration threshold; and determining the pixel polarization expected to be present in the pixel directly before display of the first image based at least in part on the counter value directly before display of the first image.

13. The method of claim 9, comprising:

receiving, using the electronic display, second image data that indicates target luminance of the pixel in a second image to be displayed on the electronic display directly after the first image from the image source communicatively coupled to the electronic display;

determining, using the electronic display, a second voltage magnitude to be applied to the pixel to facilitate display of the second image based at least in part on the second image data;

determining, using the electronic display, the pixel polarization expected to be present in the pixel directly before display of the second image based at least in part on a first display duration of the first image and the non-linear relationship between pixel polarization and duration;

determining, using the electronic display, a second voltage polarity expected to facilitate reducing the pixel polarization present in the pixel directly before display of the second image when applied to the pixel; and displaying, using the electronic display, the second image directly after the first image, wherein displaying the second image comprises applying a second voltage signal with the second voltage magnitude and the second voltage polarity to the pixel.

14. The method of claim 13, wherein determining the pixel polarization expected to be present in the pixel directly before display of the second image comprises:

adjusting a counter value at a first rate based at least in part on duration a display duration of the first image is less than a duration threshold;

adjusting the counter value at a second rate different from the first rate based at least in part on duration the display duration of the first image is not less than the duration threshold to facilitate describing the non-linear relationship between pixel polarization and duration; and determining the pixel polarization expected to be present in the pixel directly before display of the second image based at least in part on the counter value directly before display of the second image.

15. A computing device comprising:

an image source configured to output first image data that indicates target luminance of a pixel in a first image and second image data that indicates target luminance of the pixel in a second image to be displayed after the first image; and an electronic display communicatively coupled to the image source, wherein the electronic display comprises:

a driver configured to apply a first voltage signal to the pixel with a first voltage magnitude and a first voltage polarity based at least in part on the first image data to facilitate displaying the first image on the electronic display; and a timing controller communicatively coupled to the driver, wherein the timing controller is configured to:

determine a second voltage magnitude and a second voltage polarity to be applied to the pixel to facilitate display of the second image based at least in part on the second image data, the first voltage polarity of the first voltage signal, a display duration of the first image, and a non-linear relationship between pixel polarization and duration; and instruct the driver to apply a second voltage signal to the pixel with the second voltage magnitude and the second voltage polarity to facilitate displaying the second image on the electronic display with improved perceived image quality.

16. The computing device of claim 15, wherein, to determine the second voltage polarity, the timing controller is configured to:

determine a value indicative of the pixel polarization present in the pixel directly before display of the second image based at least in part on the display duration of the first image and the non-linear relationship between pixel polarization and duration; and determine the second voltage polarity based at least in part on the value to facilitate reducing the pixel polarization present in the pixel directly before display of the second image during subsequent display of one or more image.

17. The computing device of claim 15, comprising a counter communicatively coupled to the timing controller, wherein:

the counter is configured to:

adjust a counter value at a first rate based at least in part on duration the display duration of the first image is less than a duration threshold; and adjust the counter value at a second rate different from the first rate based at least in part on duration the display duration of the first image is not less than the duration threshold to facilitate describing the non-linear relationship between pixel polarization and duration; and the timing controller is configured to determine the second voltage polarity based at least in part on the counter value directly before display of the second image to facilitate reducing pixel polarization present in the pixel during subsequent display of one or more image.

18. The computing device of claim 15, wherein:

the image source is configured to:

output image data while not operating in a sleep mode; and cease outputting image data while operating in the sleep mode; and the timing controller is configured to determine the second voltage polarity to be applied to the pixel to facilitate display of the second image based at least in part on a sleep duration of the image source and the non-linear relationship between pixel polarization and duration when the image source switches to the sleep mode between display of the first image and the second image.

19. The computing device of claim 18, comprising a timer communicatively coupled to the timing controller, wherein:

the timer is configured to start incrementing a timer value when the image source switches into the sleep mode and stop incrementing the timer value when the image source subsequently switches out of the sleep mode; and the timing controller is configured to determine the sleep duration of the image source based at least in part on the timer value when the second image data is received.

20. The computing device of claim 18, comprising a counter communicatively coupled to the timing controller, wherein:

the counter is configured to:

adjust a counter value at a first rate based at least in part on duration the display duration of the first image is less than a first duration threshold;

adjust the counter value at a second rate different from the first rate based at least in part on duration the display duration of the first image is not less than the first duration threshold to facilitate describing the non-linear relationship between pixel polarization and duration; and when the image source switches to the sleep mode between display of the first image and the second image:

adjust the counter value at a third rate based at least in part on duration the sleep duration of the image source is less than a second duration threshold; and adjust the counter value at a fourth rate different from the third rate based at least in part on duration the sleep duration of the image source is not less than the second duration threshold; and the timing controller is configured to determine the second voltage polarity to be applied to the pixel to facilitate display of the second image based at least in part on the counter value directly before display of the second image to facilitate reducing pixel polarization present in the pixel during subsequent display of one or more image.

* * * * *